United States Patent [19]
Gurley et al.

[11] 3,847,413
[45] Nov. 12, 1974

[54] QUICK RELEASE COUPLING

[75] Inventors: Derrell G. Gurley, New Orleans, La.; James P. Chisholm, Sand Springs, Okla.

[73] Assignee: The Dow Chemical Company, Midland, Mich.

[22] Filed: Oct. 23, 1973

[21] Appl. No.: 408,712

[52] U.S. Cl............................ 285/316, 285/DIG. 21
[51] Int. Cl.............................................. F16l 37/18
[58] Field of Search ...... 285/315, 316, 83, DIG. 21, 285/306, 277, DIG. 7

[56] References Cited
UNITED STATES PATENTS

| | | | |
|---|---|---|---|
| 2,921,802 | 1/1960 | Conner | 285/83 X |
| 2,962,096 | 11/1960 | Knox | 285/83 X |
| 3,291,152 | 12/1966 | Comer | 285/83 X |

FOREIGN PATENTS OR APPLICATIONS

| | | | |
|---|---|---|---|
| 484,768 | 5/1938 | Great Britain | 285/315 |
| 1,071,948 | 3/1954 | France | 285/315 |

*Primary Examiner*—Dave W. Arola
*Attorney, Agent, or Firm*—Earl D. Ayers

[57] ABSTRACT

The invention is a pipe or hose coupling which is held engaged by a source of fluid pressure. On release of the fluid pressure, the coupling disengages instantly. Coupling and decoupling is accomplished by the advancement or retraction of a piston which on advancement forces ball elements into detents and on retraction removes the ball elements from the detents. The ball elements are a part of the female coupling element and the detents are in the peripheral surface of the male coupling element.

4 Claims, 3 Drawing Figures

PATENTED NOV 12 1974  3,847,413

QUICK RELEASE COUPLING

BACKGROUND OF THE INVENTION

This invention relates to pipe or hose coupling assemblies and particularly to such assemblies which may automatically be decoupled from a remote point.

Quick connecting and disconnecting couplings have been available for many years. However, many of such couplings require hammering to open or close the coupling, thus requiring the coupling to be situated where people may work on it. When a hose which is under considerable pressure must be decoupled under emergency conditions, being in the vicinity of the coupling can be very dangerous.

OBJECTS OF THE INVENTION

A principal object of this invention is to provide an improved, remotely actuated pipe or hose coupling.

Another object of this invention is to provide an improved, easy to use and reliable remotely actuated pipe or hose coupling.

A further object of this invention is to provide an improved fluid actuated quick release coupling.

In accordance with this invention, there is provided a pipe or hose coupling which is held engaged by a source of fluid pressure. On release of the fluid pressure, the coupling disengages instantly. Coupling and decoupling is accomplished by the advancement or retraction of a piston which on advancement forces ball elements into detents and on retraction removes the ball elements from the detents. The ball elements are a part of the female coupling element and the detents are in the peripheral surface of the male coupling element.

BRIEF DESCRIPTION OF THE DRAWING

The invention, as well as additional objects and advantages thereof, will best be understood when the following detailed description is read in connection with the accompanying drawing, in which.

DETAILED DESCRIPTION OF THE DRAWING

Figure 2:
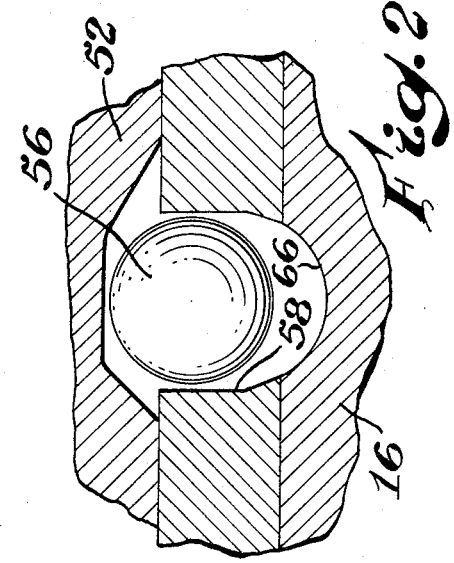
FIG. 2 is a fragmentary view showing the position of the ball elements in the uncoupled position of the coupling.

Referring to the drawing, there is shown pipe or hose coupling apparatus, indicated generally by the numeral 10. The apparatus includes a male coupling section 14 and a female coupling section 12.

The male coupling section 14 has a threaded end 13 to which a hose or pipe may be conventionally coupled. The section 14 has an elongated tubular part 16 of greater diameter than the threaded end 13.

The tubular part 16 has a shoulder section 15 at the end thereof which is remote from the threaded end 13.

A seal 60 is provided in the outer periphery of the part 16 near the end thereof adjacent to the threaded end 13. A similar seal 62 is provided around the periphery of the shoulder 15.

A plurality (there would be four in the embodiment shown) of dimpled detents 66 are disposed in an array around the outer peripheral surface of the tubular part 16.

The female half 12 of the coupling assembly 10 includes a tubular part 18 having threads 17 at one end and threads 22 along its outer periphery adjacent to but spaced from the threads 17.

A generally tubular part 64 of larger internal diameter than the internal diameter of the tubular part 18 is adapted to fit closely but slidably over the outer periphery of the male section 14, fitting against the shoulder 15 adjacent to the part 18.

A bleed hole 19 extends from the end part which abuts against the shoulder part 15 to the outer end of the part 18.

The outer diameter of that part of the part 64 which is most remote from the part 18 is larger than the outer diameter of the part 18, but the end section of the part 18 has a reduced diameter part 23 extending from the shoulder 40 to near the threads 22.

The part 64 has an array of bores 58 extending therethrough in alignment with the dimpled parts 66 when the female section 12 and male section 14 are fully joined.

Figure 1:
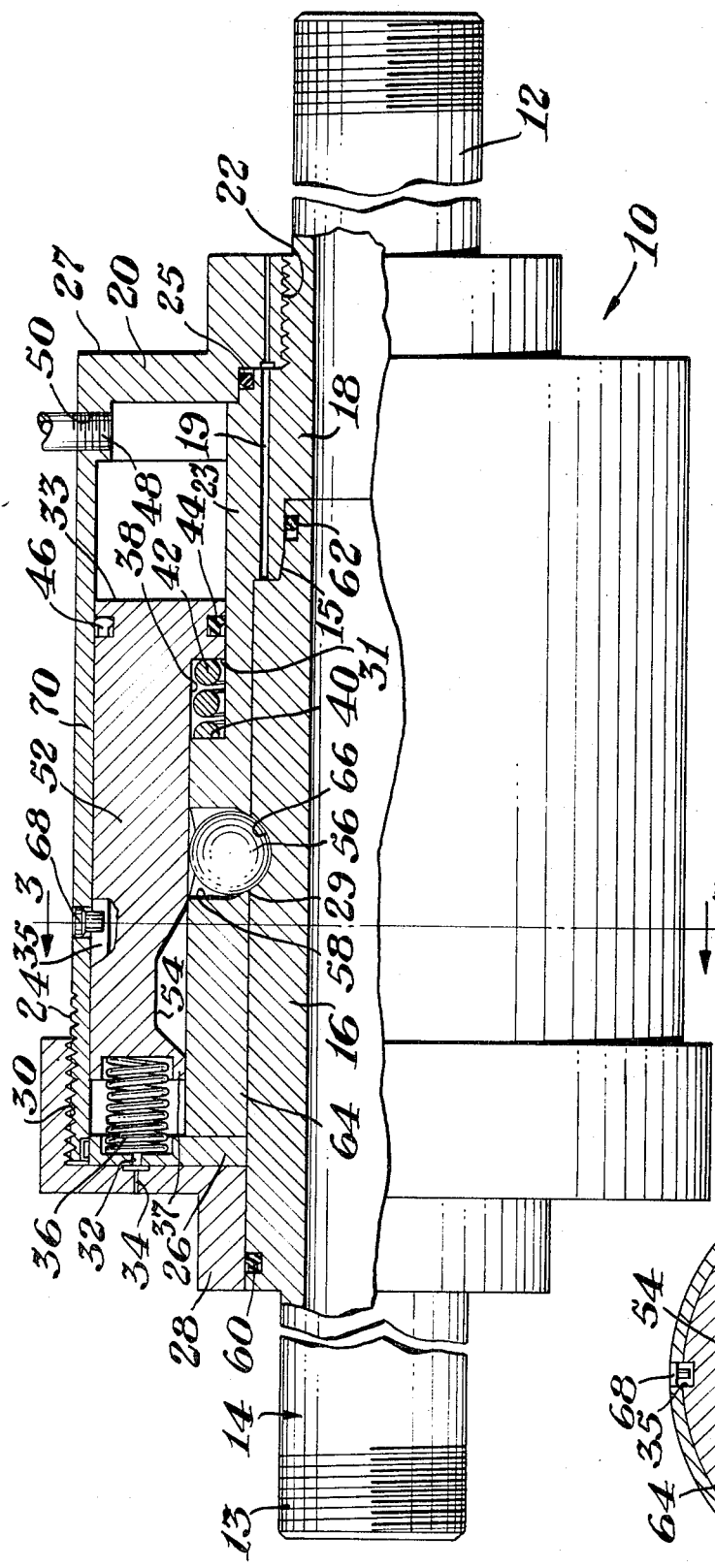
FIG. 1 is a side elevational view, partly broken away and in section, of a quick release coupling in accordance with this invention and shown in the coupled position.
Figure 3:
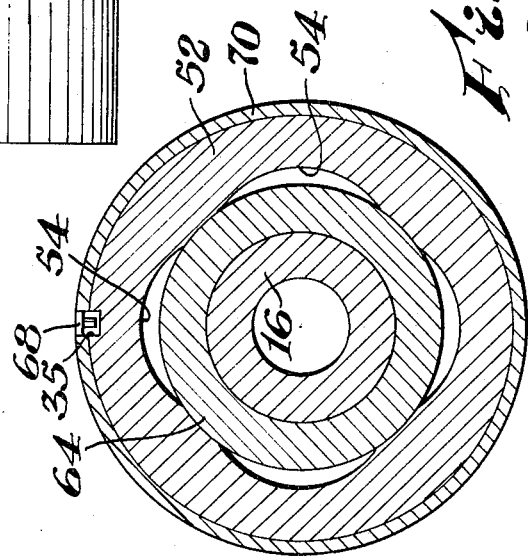
FIG. 3 is a sectional view taken along the line 3—3 of FIG. 1.

As shown in FIG. 1, each bore 58 contains a ball element 56 which extends for a minor part of its diameter into a dimpled part 66. The bores 58 each have an inset part 29 at its lower end, the inner diameter of the inset part 29 being less than the diameter of the ball elements 56.

A hydraulic cylinder housing member 20 having a tubular wall 70 and a closed end 27 with a bore therethrough having threads engaging the threads 22, extends just beyond the unattached end of the part 64. The open end of the wall 70 contains threads 30 on its outer surface. A seal 25 is provided between the end 27 and the part 18 of the female coupling section 12. A bleed bore 21 extends through the end 27, communicating with bore 19.

A bore 50 in the wall 70 near the closed end 27 has a hydraulic line 48 coupled between the hydraulic cylinder 20 and a hydraulic pressure source (not shown).

A hydraulic piston 52 of generally tubular configuration and having an inwardly extending flange 31 at its driven end 33, fits in the annular space between the outer surface of the female coupling section 12 and the inner surface of the hydraulic cylinder 20. The piston 52 contains a slot 35 in which set screw 68 extends from the wall 70.

A coil spring 42 extends from the shoulder 40 to the flange 31. In addition, a coil spring 36 extends from the forward end 37 of the piston 52 against an end plate 26 which is held in place by an end cap 28 which fits closely around the outer periphery of the male part 16. The cap 28 and part 16 are separated by a seal 60. The end cap engages the threads 30 on the wall 70. Bleed holes 32 and 34 permit the escape of air from the space ahead of the end 37 of the piston 52. Seals 44, 46 are provided between the inner periphery of the flanged end of the piston 52 and the outer periphery of the part 23 and between the outer periphery of the piston 52 and the inner periphery of the wall 70.

An array of grooves 54 are disposed in the inner peripheral surface of the piston 52, the location of the grooves being between the forward end 37 of the piston and the bores 58 when the piston 52 is in its most advanced position. The grooves 54 are longer and wider than the widest diameter of the bores 56 and are deeper than the depth of the dimpled parts 66. The groove depth however, is less than half the diameter of the balls 56.

OPERATION

In operation, with no hydraulic pressure on the piston 52, the springs 36, 42 force the piston back, placing the grooves 54 over the balls 56.

The male section 14 and female setion 12 then are separated, the edge 29 of the bore 58 lifting the balls 56 out of the dimpled parts 66 so that the male and female parts slide apart.

To recouple the parts, the male section 14 has its part 16 inserted in the inner periphery of the female section 12, pressure between the abutting ends of the parts being relieved through the bleed holes 19, 21. Pressure is then applied to the piston 52 through the line 48, forcing piston 52 forward, the tapered groove surface of the grooves 54 bearing against the balls 56 to force them into the dimpled parts 66. When the piston 52 is fully advanced, the grooves 54 are beyond contact with the balls 56 and the two parts 12, 14 are securely held and sealed together (via seal 61). The springs 36, 42 are also at maximum compression.

Such quick release couplings find advantageous use in many places, particularly in offshore use where a flow line is connected between a barge and a fixed location.

The coupling may be instantly and remotely released merely by releasing pressure on the piston 52.

The dimpled elements 66 may be replaced by a groove extending around the outer periphery of the part 16.

What is claimed is:

1. Quick release coupling apparatus comprising male and female coupling members, said coupling members each being adapted to be attached at one end to a line member, said female member having an attachment section including inner and outer peripheral tubular walls, closed ends, and an advanceable and retractable generally tubular piston disposed in sealing contact with and within the space defined by said inner and outer walls and closed ends, means for limiting rotary motion of said piston, said inner peripheral wall having an array of bores extending therethrough, said bores being of smaller diameter at the side of said inner peripheral wall which is adapted to receive said male coupling member, said piston having an array of grooves in its inner surface, said grooves being disposed over said bores when said piston is in its retracted position, and a plurality of balls, one of said balls being disposed in each of said bores, the maximum diameter of said balls exceeding the smaller diameter of said bores, remotely controllable hydraulic advancing and spring loaded retracting means for advancing and retracting said piston whereby said grooves therein may be misaligned or aligned with said balls, said male member having an outer peripheral part shaped to mate with the inner peripheral wall of said female part, said outer peripheral part having at least a plurality of depressed surface parts which are aligned with said bores of said female part when said male and female members are mated, the depth of said depressed surface parts being a minor fraction of the diameter of said balls.

2. Apparatus in accordance with claim 1 where said depressed surface parts have side walls having the same radius of curvature as do said balls.

3. Apparatus in accordance with claim 1 wherein the depth of said grooves exceeds the depth of said depressed surface parts.

4. Apparatus in accordance with claim 1 wherein means are provided for maintaining said piston in a constant radial relationship with respect to said array of bores.

* * * * *